United States Patent Office 2,702,170
Patented Feb. 15, 1955

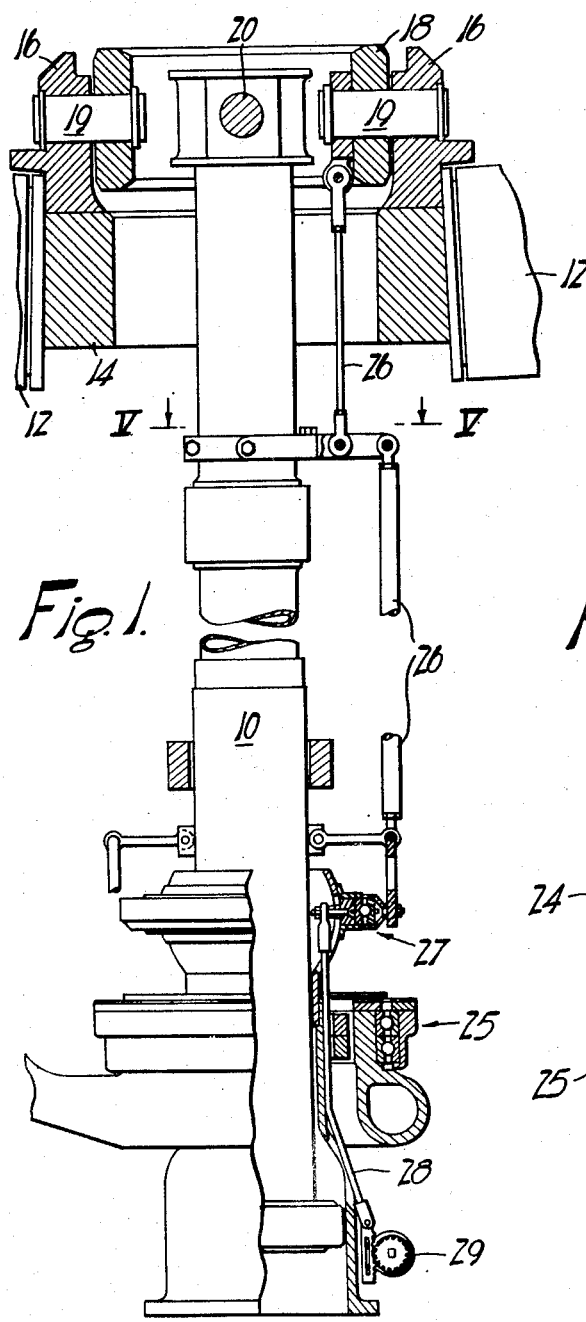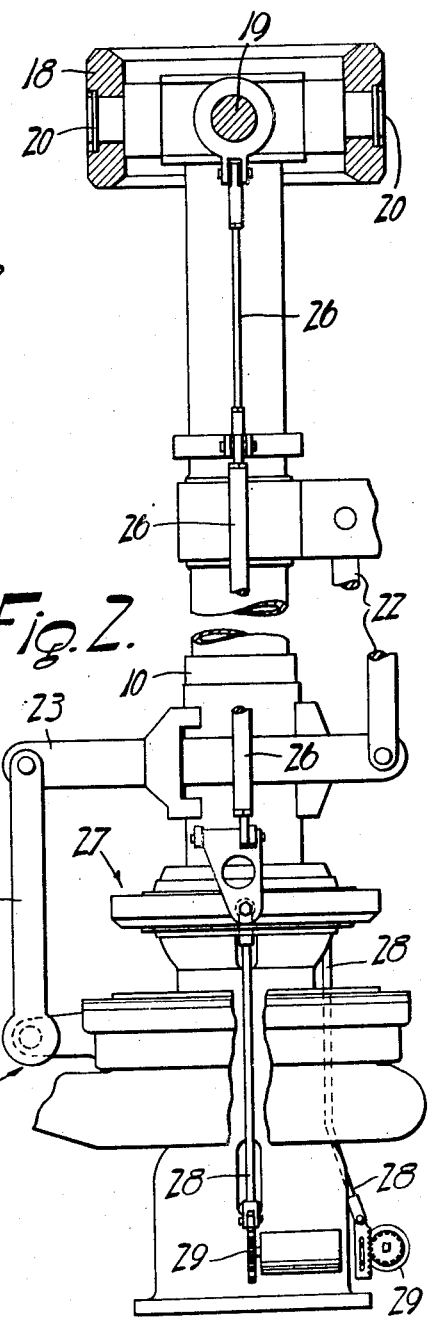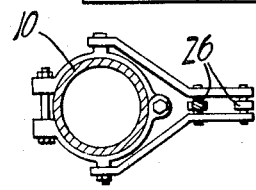
Fig. 1.
Fig. 2.
Fig. 5.
INVENTOR.
George H. Linnabery
BY
Bean, Brooks, Buckley & Bean
ATTORNEYS

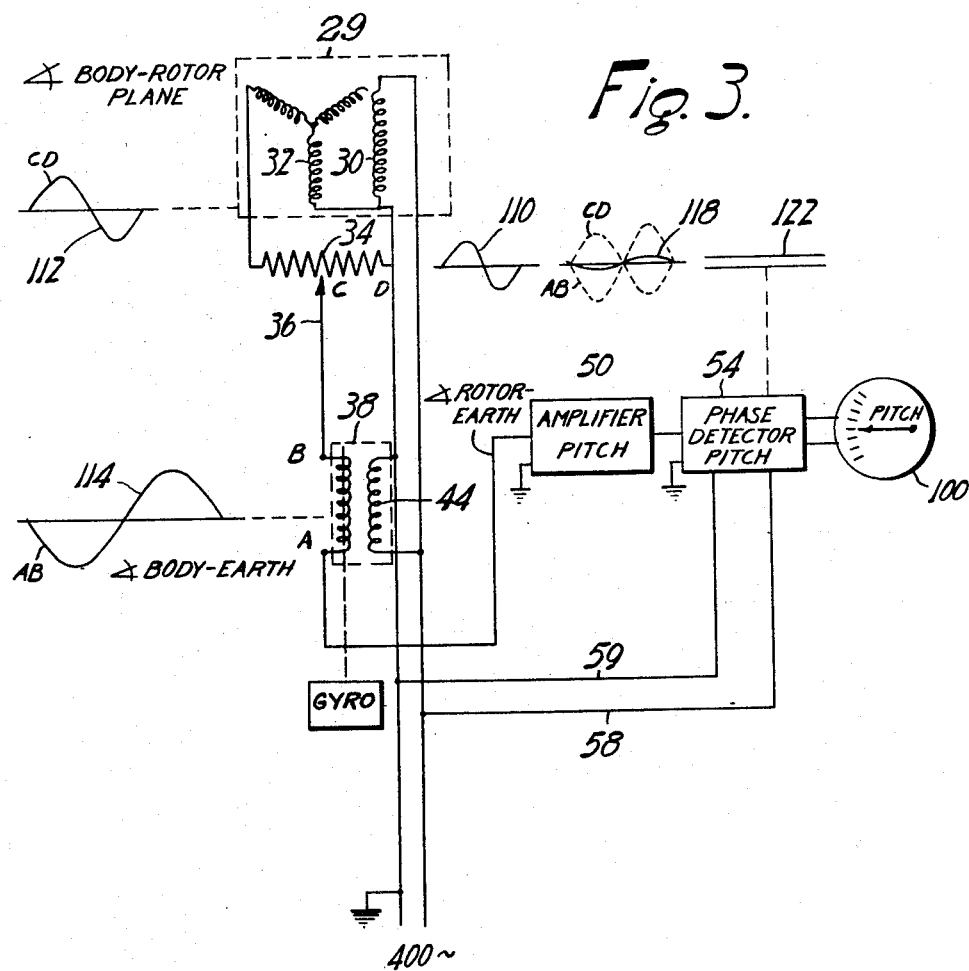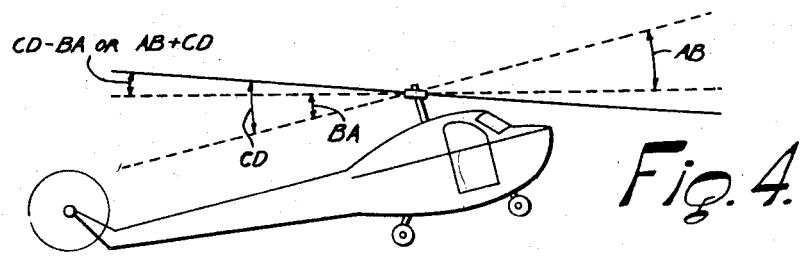

2,702,170

ROTARY WING ATTITUDE INDICATOR SYSTEM

George H. Linnabery, Hurst, Tex., assignor to Bell Aircraft Corporation, Wheatfield, N. Y.

Application November 18, 1950, Serial No. 196,463

8 Claims. (Cl. 244—17.11)

This invention relates to rotary wing aircraft, and more particularly to instrument flight means in helicopter aircraft or the like.

An object of the invention is to provide in helicopter aircraft an improved instrument flight means whereby proper attitude control may be maintained under blind flying conditions.

Another object of the invention is to provide an instrument as aforesaid which furnishes a signal for angle of tilt of the aircraft lift rotor relative to an absolute horizon, in both forward and aft and lateral directions; and which employs no slip rings or the like to cause radio interference and no electrical devices in the rotating system whereby the mechanism will operate in any weather and will require less maintenance than other devices for the purpose.

Other objects and advantages of the invention will appear from the specification hereinafter.

The present invention contemplates utilization of a rotor tilt source of intelligence together with novel transmission and interpretation devices which will provide to the pilot accurate information at all times as to the rotor attitude. Whereas a helicopter type aircraft comprises essentially a main lift rotor and a fuselage or body which suspends pendulously therebelow, flight control effects in such aircraft depend primarily upon the lift rotor disc attitude relative to the horizon and are substantially independent of swinging movements of the fuselage therebelow. More specifically, it is now well known that in any given machine a given rotor disc tilt angle will provide a given stabilized velocity condition. For example, for hovering at zero airspeed the rotor will be disposed essentially level with respect to the horizon, and for every given horizontal flight velocity there is a corresponding rotor disc tilt angle with respect to the horizontal and such functions are entirely independent of the center of gravity position, fuselage pitching moments, and the like. Thus, since any deviation of the rotor attitude relative to the horizon will result in a change of velocity, it is essential that the pilot be instantly furnished with information as to such deviation in order to anticipate the change and correct for it by suitable adjustment of his controls; and the present invention therefore contemplates a flight instrument system which provides the pilot with an anticipatory method of maintaining a desired condition of flight without being distracted by gust factors and the like such as would upset the operation of any conventional flight instrument.

More specifically, the invention contemplates arrangement in a helicopter aircraft or the like of a first signal generator responsive to tilting of the rotor disc relative to the mounting fuselage, and a second signal generator responsive to tilting of the fuselage relative to the horizon; and means for comparing and interpreting the two signals so generated as to provide a resultant signal which is transmitted to a cockpit instrument for visually indicating to the pilot the attitude of the rotor disc relative to the horizon independently of the attitude of the fuselage. In accord with the usual representation of universal tilting movements by means of pitch and roll components such resultant information are furnished with respect to fore and aft tilting of the rotor disc as well as lateral tilting of the rotor disc.

In brief, a practical embodiment which the invention may take may include a swash plate device mounted on the lift rotor shaft for universal tilting thereon; the outer race thereof being mechanically linked to the rotor to be actuated by flapping thereof and the inner race of the swash plate device being machanically linked to the armatures of a pair of Selsyn transmitter devices arranged to provide output voltages proportional to the rotor tilt movements in two directions relative to the rotor mast. At the same time a standard vertical gyro is provided to supply output voltages proportional to longitudinal and lateral fuselage tilts relative to the horizon; and the outputs from these two sources are series added and then amplified. After being amplified the resultant output voltages are converted into corresponding direct current signals and then are fed into two sensitive center-reading D. C. volt meters. These volt meters of course may be arranged with any desired dial arrangements so as to present to the pilot a suitable picturization of the attitude information.

For example, in the drawing:

Fig. 1 is a fragmentary elevation partly in section of a helicopter lift rotor and Selsyn control arrangement of the invention;

Fig. 2 is a transverse elevational and sectional view thereof;

Fig. 3 is a diagram of an electrical system of the invention;

Fig. 4 is an illustration of operation of the invention; and

Fig. 5 is a section taken along line V—V of Fig. 1.

Referring now more specifically to the drawing, the invention is illustrated in connection with a helicopter aircraft including a rotor drive shaft 10 which of course is positionally integral with the fuselage and engine driven as is well known in the art. The lift rotor mounted at the top of the shaft 10 is illustrated to comprise a pair of diametrically opposed blades 12—12 rooted upon a hub 14 but individually rotatable thereon for pitch change purposes. The hub 14 is in turn mounted for universal inclination relative to the mast 10 by means of paired stirrups 16—16 pivotally connected to a gimbal ring 18 by means of aligned pivot devices 19—19 having their pivot axes aligned longitudinally of the blades 12—12. In turn the ring 18 is pivotally mounted upon the mast 10 by means of diametrically opposed pivot devices 20 having their pivot axes aligned at right angles to the axes of the pivot devices 19—19; and thus as the shaft 10 rotates the rotor blades are driven to rotate therewith while at the same time the rotor blade tip path plane is universally inclinable relative to the mast. The rotor blades 12 are each provided with actuating horns which connect to push-pull rods 22 in turn connected to links 23 and 24 and thence to a swash plate device 25 which is mounted for universal inclination on the mast 10 whereby the plate 25 may be pilot controlled as desired to in turn produce cyclic pitch change effects in the blades 12—12 for controlling the plane of rotation of the rotor as is well known in the helicopter art.

Thus, it will be appreciated that the rotor system illustrated herein is mounted so that the rotor blade tip path plane is tiltable universally relative to the mast incidental to upsetting disturbances as by wind gusts, and also for purposes of maneuvering control of the aircraft. In the illustrated form of the apparatus, such tilting of the rotor relative to the mast or fuselage of the aircraft is measured by means of a signal generator means carried at the base of the mast 10 and connected to the rotor to be driven thereby as it pivots or "flaps" upon the bearings 20—20 while describing a tilted rotor blade path. The requisite electrical signals may be derived from a suitable source such as a pair of Selsyn or Autosyn generators, or potentiometers, or voltage generators; in any case the source being mechanically driven by the actual flapping motion of the rotor upon the pivots 20—20. Thus, the mechanism may comprise a push-pull system 26 pivotally connected at one end to the rotor and mounted to extend downwardly along the shaft 10 to rotate therewith and connected at its lower end to the outer race of a swash plate 27. The inner race of the swash plate is connected by means of a pair of push-pull members 28—28 disposed in longitudinal and transverse plan view alignments respectively with the mast 10 and in turn connecting to the actuating mechanisms of a pair of corresponding Selsyn generators 29—29. The bearing support for the swash plate 27 must have incorporated therein a certain amount of friction so as to maintain the plate 27 any position of tilt as dictated by push pull member 26 as it rotates around the shaft 10. Thus, the swash plate 27 is actuated to tilt relative to the mast 10 and in this respect to parallel and follow the rotor plane.

In the illustrated embodiment of the invention, a pair of Selsyn generators disposed in spaced relation about the axis of the shaft 10 are utilized to measure the pitch and roll motions respectively of the rotor as the latter deviates from its neutral position of substantial perpendicularity to the rotor mast. One of these Selsyn generators is shown diagrammatically in Fig. 3 as representing the pitch responsive generator to comprise a rotor or primary winding 30 and a stator or secondary winding 32 having three terminals and being arranged to provide changing outputs as the rotor of the Selsyn is turned, as is well known in the art. In this case one of the terminals of the rotor winding 32 is connected to one of the terminals of the stator winding 30 and to ground, and only one of the other terminals of the stator winding 32 is used, this being connected through a potentiometer resistance 34 to ground so that an adjustable output signal CD may be obtained between the potentiometer slide 36 and the ground. As will be readily understood, when the rotor coil 30 is energized by a suitable alternating current potential, an output voltage will be secured at CD which is proportional in amplitude to the displacement of the Selsyn rotor from a neutral position and which varies in sense (that is, undergoes a 180° phase shift) according to the direction of displacement of the Selsyn rotor from that neutral position.

As stated more generally hereinabove, a standard type vertical gyroscope is mounted within the fuselage of the helicopter, and one of the signal output elements of such a gyro is illustrated diagrammatically at 38 to comprise the pitch pick-off coil which is externally energized by the 400 cycle line. The output of this pickoff is proportional in amplitude to the displacement of the gyro rotor with respect to its case from a neutral position and which varies in sense (that is, undergoes a 180° phase shift) according to the direction of displacement of the gyro rotor from that neutral position.

Signal CD is series added to signal AB, point D being connected to ground as stated above. The polarities of the signals AB and CD are relatively fixed by connecting the energizing 400 cycle per second voltage to the Selsyn and gyro circuits appropriately, so that the series addition of the signals eliminates the position of the mast 10 from consideration, as shown in Figure 4. Terminal A is connected to amplifier 50, the other input terminal of which is grounded to complete the circuit to D. The output of the amplifier 50 is then fed as input signal into a phase detector 54 where it is compared to a reference voltage supplied from lines 58—59 which are connected to the same 400 cycle per second supply which is used to excite the primary of the gyro pickoff 44 as well as the rotor winding 30. This phase detector 54 is employed to determine the sense of the input signal, that is, whether that input signal is in phase with or 180° out of phase with the 400 cycle per second reference voltage of the lines 58—59 and also to convert the alternating current input signal to a direct current output which corresponds thereto in both sense and amplitude, and, of course, any suitable type of detector may be used.

The output of the phase detector is fed into the terminals of a center reading direct current volt meter 100, the indication of which is therefore proportional to the rotor plane angle. It will be understood that the above described system is duplicated for roll movements of the rotor plane and the gyro with respect to the body, and the corresponding signals so generated may be referred to as C′D′ and A′B′.

The operation of the illustrated embodiment of the invention will be explained in connection with a series of voltage-time diagrams which illustrate the form of signal present in the various parts of the circuit, but it is to be understood that no attempt has been made to relate these diagrams to the positions of the signal source elements as shown, the diagrams being arbitrary and for the purpose of illustrating the following discussion only. The common 400 cycle per second energizing potential is illustrated at 110, and as hereinbefore described, when the rotor blade 12 describes a tilted rotor path with respect to the mast 10 and causes a corresponding motion of the swash plate 27 and also of the Selsyn generator 29, an output voltage 112 is obtained at CD which is proportional to the angle between the rotor plane and mast. This voltage is added as shown in Figure 3 to the gyro signal AB as at 114, it being proportional to the angle between the body of the helicopter and the earth; and the resultant signal 118 is applied to the input of the amplifier 50. The signal voltage 118 is therefore proportional to the angle of the rotor plane relative to the earth, and the output of the phase detector 122 is therefore a D. C. voltage which is proportional in polarity and amplitude to this angle.

It will be appreciated that an important feature of the invention resides in utilizing the attitude of the fuselage as an intermediate reference between the attitude of the rotor path or disc and the horizon as established by the fuselage-carried gyro. This is shown in Fig. 4 wherein the relationships involved are illustrated. Thus, the rotor 12 is shown revolving in a plane disposed at an angle cd with respect to its normal position of perpendicularity to the mast 10, while the fuselage 110 makes an opposite angle ab with respect to the horizontal as established by a gyro carried thereby. The actual tilt of the rotor disc is therefore the difference between cd and ba; or in other words, the sum of ab and cd. Thus, if the electrical signals AB, CD, A′B′, and C′D′ are similarly compared as hereinabove described the rotor tilt with respect to the horizon will be indicated irrespective of the attitude of the helicopter fuselage.

While a specific choice and arrangement of elements has been illustrated wherein 400 cycle per second signals of varying sense and amplitude are generated, compared, and interpreted; it will be obvious that other arrangements and different elements could be substituted in carrying out the invention. For example, the output signal might be supplied to an autopilot device instead of to visual indicator meters, or the illustrated alternating current system might be supplanted with a direct current system or a phase-modulated system. Likewise, the signal generators might be made responsive to velocity of displacement.

Thus, the invention contemplates a flight instrument which employs any suitable means to reveal operating conditions of the rotor, and additionally provides for comparison of such information with the displacement of the fuselage with respect to the horizon or other reference so that the operating condition of the rotor with respect to the horizon or other reference may be indicated; and the invention is not limited to any specific means of measurement or comparison or ultimate use of that comparison. In any case the electrical components of the system may be mounted within the fuselage where they are protected from weather and mechanical injury; and the system eliminates need for electrical slip rings or the like such as would otherwise cause maintenance problems and radio interference effects.

I claim:

1. In a rotary wing aircraft comprising a lift rotor having multiple individually pitch change adjustable blades, a fuselage suspended pendulously below said rotor by means of rotor mast means positionally integral with said fuselage and pivotally connected to said rotor, and pitch change means for selective pitch adjustments of said blades, separate coordinate rotor signal generating means mechanically driven independently of said pitch change means in direct accordance with the tilt of the path of rotation of said rotor with respect to said fuselage, gyroscope means for establishing a reference plane substantially independent of movements of said fuselage, gyroscope coordinate signal generating means mechanically actuated in accordance with the tilt of said fuselage with respect to said reference plane, and means for comparing the corresponding coordinate signals of said rotor and said gyroscope signal generating means to define the tilt of said rotor path with respect to said reference plane independently of movements of said fuselage.

2. In a rotary wing aircraft comprising a lift rotor and a fuselage suspended pendulously thherebelow by means of rotor mast means positionally integral with said fuselage and pivotally connected to said rotor, rotor attitude signal generating means, mechanical driving means connected to actuate said rotor attitude signal generating means in direct accordance with the attitude of the path of rotation of said rotor with respect to said fuselage, said driving means comprising push pull means connected to a root portion of said rotor for reciprocating actuation in direct accordance with tilt movements thereof, swash plate means connected to said push pull means for adjustment thereby to positional agreement with the attitude of said rotor, and means connecting said rotor attitude signal generating means directly to said swash plate means to actuate said rotor attitude signal generating means in direct accordance with the position of said swash plate means, gyroscope means for establishing a reference plane substantially independent of movements of said fuselage, gyroscope signal generating means mechanically actuated in accordance with the attitude of said fuselage with respect to said reference plane, and means for comparing the signals of said respective generating means to define the attitude of said rotor path with respect to said reference plane independently of movements of said fuselage.

3. In a rotary wing aircraft comprising a lift rotor having individually pitch change adjustable blades, a fuselage suspended pendulously below said rotor by rotor mast means positionally integral with said fuselage and pivotally connected to said rotor, and pitch change means for selective pitch adjustments of said blades, intermediate swash plate means connected to said rotor to be mechanically positionally adjusted in direct accordance with the tilt of the path of rotation of said rotor with respect to said fuselage, said intermediate swash plate means being separate from and independent of said pitch change means, rotor tilt signal generating means operable by said intermediate swash plate means for generating a signal at all times corresponding exactly to the tilt of said rotor path, gyroscope means for establishing a reference plane substantially independent of movements of said fuselage, gyroscope signal generating means mechanically actuated in accordance with the tilt of said fuselage with respect to said reference plane, and means for comparing the signals of said respective generating means to define the tilt of said rotor path with respect to said reference plane independently of movements of said fuselage.

4. In a rotary wing aircraft comprising a lift rotor and a fuselage suspended pendulously therebelow by means of rotor mast means positionally integral with said fuselage and pivotally connected to said rotor, rotor tilt signal generating means, mechanical driving means connected to actuate said rotor tilt signal generating means in accordance with the tilt of the path of rotation of said rotor with respect to said fuselage, said driving means comprising single push pull means connected to a root portion of said rotor for reciprocating actuation in accordance with tilt movements thereof, frictionally mounted swash plate means connected to said push pull means for adjustment thereby to positional agreement at all times with said rotor, and means connecting said rotor tilt signal generating means directly to said swash plate means for operation at all times in accordance with the position of said swash plate means, gyroscope means for establishing a reference plane substantially independent of movements of said fuselage, gyroscope signal generating means mechanically actuated in accordance with the tilt of said fuselage with respect to said reference plane, and means for comparing the signals of said respective generating means to define the tilt of said rotor path with respect to said reference plane independently of movements of said fuselage.

5. In a rotary wing aircraft, a lift rotor having independently pitch change adjustable blades, a fuselage suspended pivotally below said rotor, and pitch change means for selective pitch adjustment of said blades, plural measurement means separately responsive to plural coordinates of the tilt of the path of rotation of said rotor relative to said fuselage, said measurement means being independent of said pitch change means, artificial horizon means responsive to like coordinates of the tilt of said fuselage relative to a reference plane, and corresponding coordinate correlating means responsive to said measurement means and to said artificial horizon means for defining the tilt of said path of rotation relative to said reference plane in terms of coordinates.

6. In a rotary wing aircraft, a lift rotor having independently pitch change adjustable blades, a fuselage suspended pivotally below said rotor, pitch change means for selective pitch adjustment of said blades, intermediate swash plate means continuously directly responsive to the tilt of the path of rotation of said rotor relative to said fuselage, rotor tilt measurement means directly operable by said swash plate means independently of said pitch change means, artificial horizon measurement means responsive to the tilt of said fuselage relative to a reference plane, and correlating means responsive to said rotor tilt measurement means and to said artificial horizon measurement means for defining the tilt of said path of rotation relative to said reference plane.

7. In a rotary wing aircraft, a lift rotor having multiple independently pitch change adjustable blades and a fuselage suspended pivotally therebelow, pitch change means for selective pitch adjustment of said blades, intermediate swash plate means directly connected to said rotor for positional adjustment corresponding to the tilt of the path of rotation of said rotor relative to said fuselage, swash plate tilt coordinate measurement means mounted within said fuselage and operable by said swash plate independently of said pitch change means, artificial horizon measurement means responsive to like coordinates of tilt of said fuselage relative to a reference plane, and correlating means responsive to corresponding coordinate measurements from said swash plate tilt measurement means and said artificial horizon measurement means for defining the tilt of said path of rotation relative to said reference plane in terms of coordinates.

8. In a rotary wing aircraft, a lift rotor mechanism including individually pitch change adjustable blades, a fuselage, pitch change means for selective pitch adjustment of said blades, first coordinate displacement detection means mounted by said fuselage and mechanically connected to said rotor mechanism independently of said pitch change mechanism to be driven by tilt associated movements of said rotor mechanism relative to said fuselage, second coordinate displacement detection means connected to be effectively responsive to displacement of said fuselage relative to an external reference, and intelligence transmission means interconnecting said first detection means and said second detection means.

References Cited in the file of this patent

UNITED STATES PATENTS

| | | |
|---|---|---|
| 2,427,939 | Woods | Sept. 23, 1947 |
| 2,443,192 | Moeller | June 15, 1948 |
| 2,479,549 | Ayres et al. | Aug. 23, 1949 |
| 2,529,479 | Bates | Nov. 14, 1950 |
| 2,567,212 | Klopp et al. | Sept. 11, 1951 |